United States Patent
Jarrossay et al.

(10) Patent No.: US 12,221,387 B2
(45) Date of Patent: Feb. 11, 2025

(54) ABRADABLE COATING HAVING A HONEYCOMB STRUCTURE MADE OF COMPOSITE MATERIAL HAVING A CERAMIC MATRIX MADE OF SHORT FIBERS

(71) Applicants: SAFRAN AIRCRAFT ENGINES, Paris (FR); SAFRAN CERAMICS, Le Haillan (FR)

(72) Inventors: Clément Jarrossay, Moissy-Cramayel (FR); Aurélien Gaillard, Moissy-Cramayel (FR); Yann Richard, Moissy-Cramayel (FR)

(73) Assignees: SAFRAN AIRCRAFT ENGINES, Paris (FR); SAFRAN CERAMICS, Le Haillan (FR)

( * ) Notice: Subject to any disclaimer, the term of this patent is extended or adjusted under 35 U.S.C. 154(b) by 0 days.

(21) Appl. No.: 18/568,587

(22) PCT Filed: Jun. 6, 2022

(86) PCT No.: PCT/FR2022/051071
§ 371 (c)(1),
(2) Date: Dec. 8, 2023

(87) PCT Pub. No.: WO2022/263740
PCT Pub. Date: Dec. 22, 2022

(65) Prior Publication Data
US 2024/0262756 A1    Aug. 8, 2024

(30) Foreign Application Priority Data
Jun. 15, 2021  (FR) ........................... 2106286

(51) Int. Cl.
*C04B 35/80* (2006.01)
*C04B 35/628* (2006.01)
(Continued)

(52) U.S. Cl.
CPC ........ *C04B 35/80* (2013.01); *C04B 35/62878* (2013.01); *C04B 35/657* (2013.01);
(Continued)

(58) Field of Classification Search
CPC .............. C04B 2235/616; C04B 35/80; C04B 2235/526; F05D 2300/6033; F05D 2250/283; F01D 11/122; F01D 11/127
See application file for complete search history.

(56) References Cited

U.S. PATENT DOCUMENTS

2019/0292931 A1    9/2019  Landwehr et al.
2019/0360345 A1*  11/2019  De Gaillard ............ B64C 11/26
2021/0292245 A1*   9/2021  Bouillon ............... C04B 35/584

FOREIGN PATENT DOCUMENTS

CN    CN 111018537 A    4/2020
WO    WO 2019/040079 A1    2/2019

OTHER PUBLICATIONS

International Search Report as issued in International Patent Application No. PCT/FR2022/051071, dated Sep. 15, 2022.
(Continued)

*Primary Examiner* — Erin Snelting
(74) *Attorney, Agent, or Firm* — Pillsbury Winthrop Shaw Pittman LLP

(57) ABSTRACT

An abradable coating includes a tubular cell structure, wherein the the tubular cell structure includes a fibrous reinforcement of discontinuous short fibers which is densified by a ceramic matrix.

7 Claims, 3 Drawing Sheets

(51) Int. Cl.
*C04B 35/657* (2006.01)
*C04B 38/00* (2006.01)
*F01D 11/12* (2006.01)

(52) U.S. Cl.
CPC .... C04B 38/0006 (2013.01); *C04B 2235/428* (2013.01); *C04B 2235/526* (2013.01); *C04B 2235/616* (2013.01); *F01D 11/122* (2013.01); *F01D 11/127* (2013.01); *F05D 2230/20* (2013.01); *F05D 2250/283* (2013.01); *F05D 2300/6033* (2013.01); *F05D 2300/611* (2013.01)

(56) References Cited

OTHER PUBLICATIONS

Written Opinion of the International Searching Authority as issued in International Patent Application No. PCT/FR2022/051071, dated Sep. 15, 2022.

\* cited by examiner

[Fig. 1]
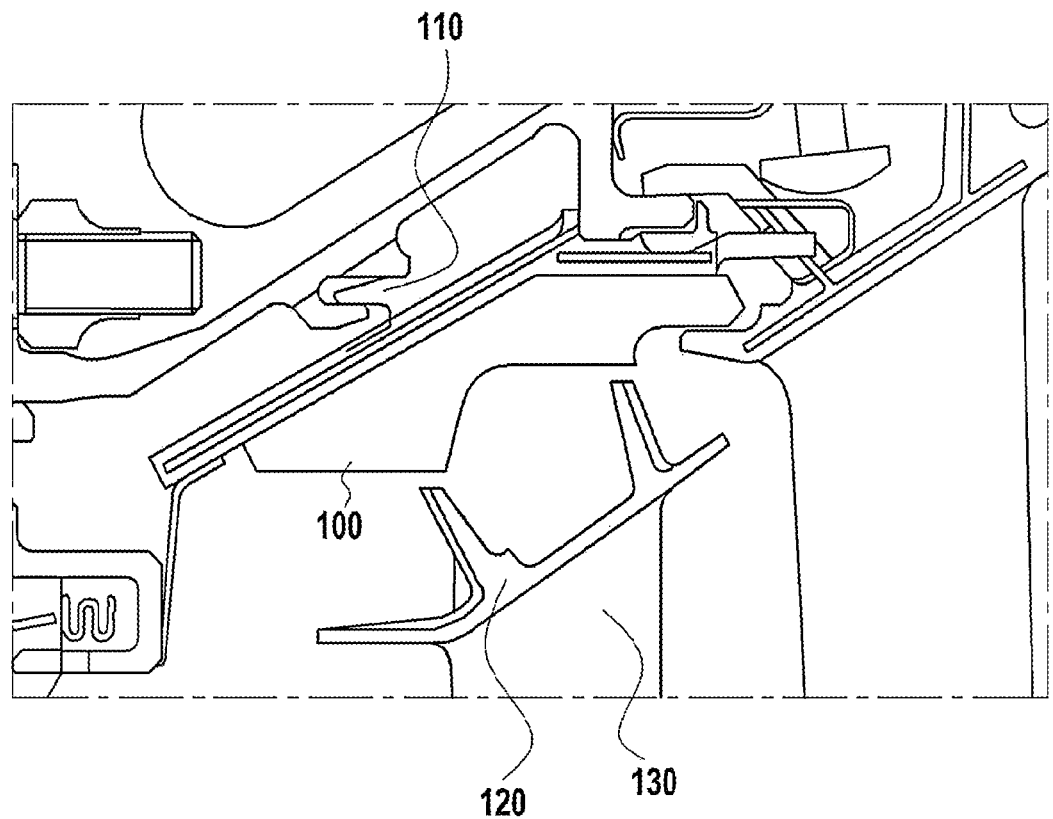
[Fig. 2]
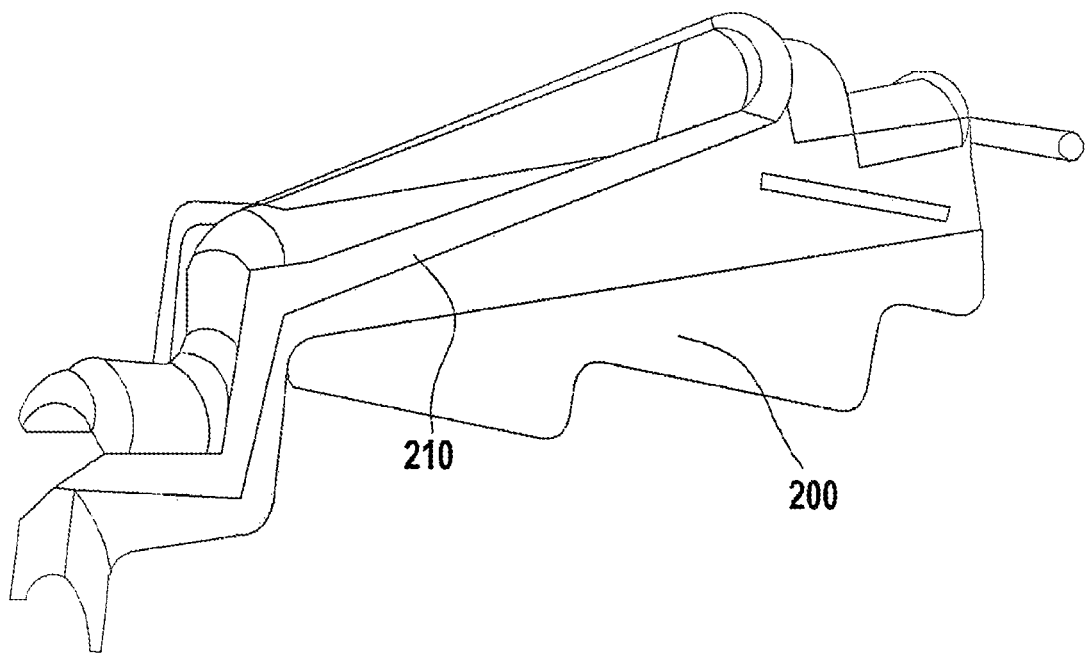

[Fig. 3]
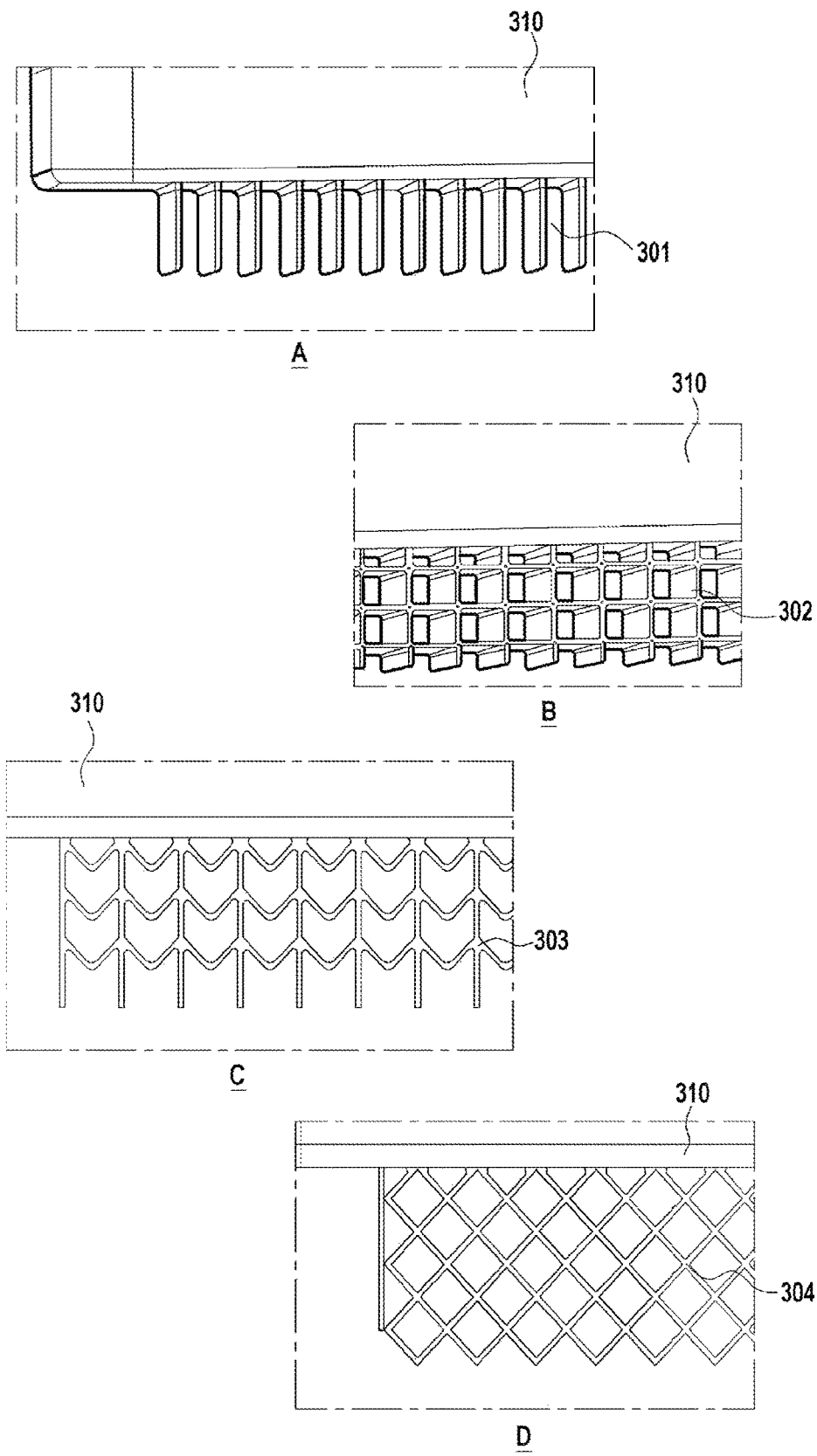

[Fig. 4]
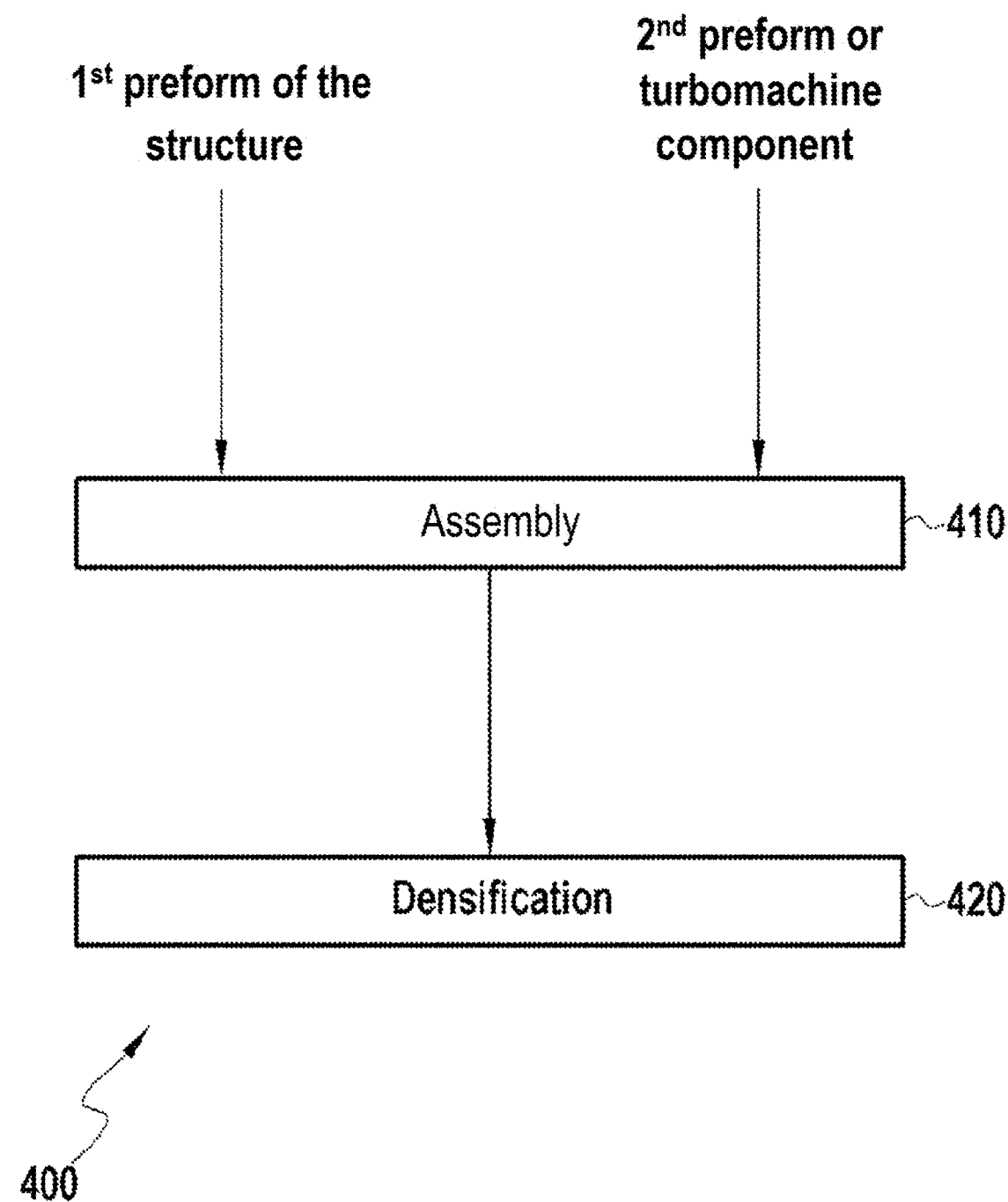

ABRADABLE COATING HAVING A HONEYCOMB STRUCTURE MADE OF COMPOSITE MATERIAL HAVING A CERAMIC MATRIX MADE OF SHORT FIBERS

CROSS-REFERENCE TO RELATED APPLICATIONS

This application is the U.S. National Stage of PCT/FR2022/051071, filed Jun. 6, 2022, which in turn claims priority to French patent application number 21 06286 filed Jun. 15, 2021. The content of these applications are incorporated herein by reference in their entireties.

TECHNICAL FIELD

The present invention relates to the general field of abradable coatings, particularly to abradable coatings comprising a tubular cell structure, and more particularly to abradable coatings whose tubular cell structure is made of composite material with fibrous reinforcement of discontinuous short fibers which is densified by a ceramic matrix.

PRIOR ART

A turbomachine ring comprises an abradable coating placed facing wipers located on a rotor opposite the ring. In operation, the wipers of the rotor can come into contact with the abradable coating in question. This will then be machined by the blade assembly, which makes it possible to control the clearance between the ring and optimize aerodynamic losses, thus guaranteeing the nominal operation and the integrity of the machine.

The tubular cell structures of these coatings are usually metallic. However, they cause an increase in the mass of the ring and also require a cooling of their temperature. Indeed, these coatings are directly in the flowpath that is to say in an environment of hot gases resulting from the combustion, and far from the cooling coming from the secondary circuits. In addition, it is not possible to make them from a ceramic matrix composite material (CMC material) with long fibers, because their thickness is too thin, less than 0.2 mm, to be able to weave the fibers of the CMC material.

It is therefore desirable to have an abradable coating that can adapt more easily to complex geometries and that is resistant to high temperatures.

DISCLOSURE OF THE INVENTION

The invention relates to an abradable coating comprising a tubular cell structure, characterized in that the tubular cell structure comprises a fibrous reinforcement of discontinuous short fibers which is densified by a ceramic matrix.

The advantage of a structure made of short fiber CMC material is that it is able to make complex shapes of thin thickness using additive manufacturing.

In addition, thanks to the use of CMC materials, it is simpler to integrate the abradable coating on the turbomachine ring or on any turbomachine component also made of CMC material. This also reduces the need for cooling at the coating level and reduces the mass of the component to which the abradable coating is applied.

According to one particular characteristic of the invention, the volume ratio of discontinuous short fibers is comprised between 10% and 25% of the volume of the tubular cell structure.

According to another particular characteristic of the invention, the tubular cells are honeycomb-shaped.

A honeycomb-shaped structure provides a well-known geometry, simple to produce and having already proven its numerous qualities.

Another object of the invention is a method for manufacturing an abradable coating according to the invention comprising:
 obtaining an assembly comprising a first preform of the tubular cell structure mounted on a second preform or on a turbomachine component, the first preform comprising a fibrous reinforcement of discontinuous short fibers and the second preform or the turbomachine component comprising a fibrous reinforcement of continuous fibers, and
 densifying the first preform of the assembly by infiltration with a molten composition comprising silicon.

According to one particular characteristic of the invention, the first preform is mounted on the second preform and there is a co-densification of the first and second preforms by the molten composition.

According to another particular characteristic of the invention, the first preform is mounted on the turbomachine component and the molten composition makes it possible to weld the tubular cell structure to the component.

According to another particular characteristic of the invention, the first preform is mounted on an abradable track of the turbomachine component.

According to another particular characteristic of the invention, obtaining the assembly comprises obtaining the first preform, by additive manufacturing or by powder injection molding, from a mixture present in a binder and comprising a matrix powder and discontinuous short fibers.

According to another particular characteristic of the invention, the second preform is a preform of a first-stage ring of a low-pressure turbomachine or the turbomachine component is a first-stage ring of a low-pressure turbomachine.

According to another particular characteristic of the invention, the second preform is a preform of a turbomachine stator or the turbomachine component is a turbomachine stator placed facing wipers located on a rotor opposite the stator.

BRIEF DESCRIPTION OF THE DRAWINGS

Other characteristics and advantages of the present invention will emerge from the description given below, with reference to the appended drawings which illustrate exemplary embodiment devoid of any limitation.

FIG. 1 schematically and partially represents a first-stage ring of a low-pressure turbomachine comprising an abradable coating according to one embodiment of the invention opposite wipers of a rotor.

FIG. 2 schematically and partially represents a first-stage ring of a low-pressure turbomachine comprising an abradable coating according to one embodiment of the invention.

FIG. 3 schematically and partially represents different geometries of tubular cell structures of an abradable coating according to the invention.

FIG. 4 schematically and partially represents the method for manufacturing an abradable coating according to one embodiment of the invention.

DESCRIPTION OF THE EMBODIMENTS

FIGS. 1 and 2 schematically and partially represent a first-stage ring 110 of a low-pressure turbomachine comprising an abradable coating 100 according to one embodiment of the invention.

The ring 110 comprises an abradable coating 100 placed on an inner surface of the ring 110 opposite wipers 120. The wipers 120 are placed on a rotor 130 opposite the coating 100 of the ring 110.

According to the invention, the abradable coating 100 comprises a tubular cell structure. The tubular cell structure comprises a fibrous reinforcement of discontinuous short fibers which is densified by a ceramic matrix.

As the ring 110 is also generally made of CMC material, therefore there will be continuity between the materials of the ring 110 and of the coating 100, which facilitates the management of the differential expansions, due to the high temperatures, in this area.

The wipers 120 placed opposite the abradable coating 100 on a rotor 130 make it possible to manage the penetration of the blades into the ring 110 according to the flight phases. This also makes it possible to manage the sealing between the ring 110 and the rotor 130 and to optimize aerodynamic losses.

More generally, the ring 110 can be an element of a stator of a turbomachine.

FIG. 2 schematically illustrates a first-stage ring 210 that comprises an abradable coating 200.

FIG. 3 represents different possible geometries of a tubular cell structure of an abradable coating according to the invention.

In FIG. 3A, the structure 301 comprises rectangular cells forming on the surface of a turbomachine component 310 a single row of rectangular cells.

In FIG. 3B, the structure 302 comprises rectangular cells forming on the surface of a turbomachine component 310 several rows of rectangular or square cells.

In FIG. 3C, the structure 303 forms on the surface of the turbomachine component 310 several rows of polygon-shaped cells.

In FIG. 3D, the structure 304 forms on the surface of the turbomachine component 310 several rows of diamond-shaped cells.

The component 310 is for example a turbomachine ring sector.

These four examples of structure 301, 302, 303 and 304 are more easily achievable in additive manufacturing than a structure having honeycomb-shaped cells.

Whatever the embodiment of the invention, the volume ratio of discontinuous short fibers in the tubular cell structure can be comprised between 10% and 25% of the volume of the structure. It is, for example, of 15%.

Whatever the embodiment of the invention, the cells of the structure may have a honeycomb geometry, and more particularly, they may have a shape as described with reference to FIG. 3A, 3B, 3C or 3D, or be of cellular shape.

The tubular cell structure may also be a volume filled with the CMC material with reinforcement of discontinuous short fibers, having a minimum porosity of 5%.

FIG. 4 schematically and partially represents a method 400 for manufacturing an abradable coating according to one embodiment of the invention.

The method 400 first comprises obtaining an assembly 410. The assembly comprises a first preform of the tubular cell structure mounted on a second preform or on a turbomachine component.

The first preform comprises a fibrous reinforcement of short fibers while the second preform or the turbomachine component may comprise a fibrous reinforcement of continuous fibers or a woven fibrous reinforcement, the reinforcement being densified by a ceramic matrix.

The method 400 then comprises the densification 420 of the first preform of the assembly. The densification 420 is made by infiltration of the first preform with a molten composition comprising silicon. The densification 420 makes it possible to form a ceramic matrix in the first preform and to interlink the first preform to the second preform or to the component. Indeed, during the densification 420, the molten composition will colonize the porosity of the preform of the tubular cell structure and interlink this preform to the second preform or to the turbomachine component.

If when obtaining the assembly 410, the first preform is mounted on the second preform, it is also possible to co-densify the first and second preforms with the molten composition during the densification step 420. This allows forming a matrix common to the two preforms and interlinking the tubular cell structure of the abradable coating to the component derived from the second preform.

If during the assembly 410, the first preform is mounted on the turbomachine component, then the infiltration of the molten composition into the first preform will make it possible to weld or braze the structure to the component.

In addition, the first preform can also be mounted on an abradable track present on the turbomachine component. In this case, during the densification 420, the molten composition has the effect of welding the structure to the abradable track and to the turbomachine component.

This welding or brazing and the common matrix ensure the passage of a force between the structure of the coating and the turbomachine component and makes it possible to ensure metallic continuity.

According to one particular characteristic of the invention, the manufacturing method 400 also comprises a machining step carried out after densification 420 to machine the densified assembly to new measurements, for example to aeronautical measurements.

According to another particular characteristic of the invention, the preform of the structure of the coating is obtained from the compaction of a blank comprising the fibrous reinforcement of discontinuous short fibers present in a binder. The compaction may be hot isostatic compaction or cold isostatic compaction or Spark Plasma Sintering.

According to another particular characteristic of the invention, the first preform is obtained from a mixture present in a binder and comprising a matrix powder and discontinuous short fibers implemented in an additive manufacturing method or in a powder injection molding method.

The binders which can be used to make the preform of the root may comprise at least one thermoplastic polymer. For example, the binder may comprise at least one compound chosen among polyvinyl alcohol (PVA), polyethylene glycol (PEG), polypropylene (PP), polyoxymethylene (POM) or polyethylene terephthalate (PET).

The binders may also comprise at least one thermosetting polymer. For example, they may comprise at least one compound chosen among epoxy resins, phenolic resins or pre-ceramic resins.

The discontinuous short fibers for the reinforcement of the first preform can be obtained in different ways: grinding, cutting, crushing of textile scraps or raw yarn bobbins.

The short fibers may have a length comprised between 50 μm and 500 μm, for example substantially of 250 μm. Their diameter may be identical to that of the basic fibers from which they are derived, it is for example comprised between 8 μm and 14 μm. The methods for obtaining discontinuous short fibers are known to those skilled in the art, they will therefore be able to determine the manufacturing parameters making it possible to obtain the lengths of discontinuous short fibers necessary for the intended application.

According to one particular characteristic of the invention, the discontinuous short fibers are coated with an interphase. The interphase is for example made up of a layer of boron nitride BN. This makes it possible to deflect the matrix cracks from the matrix that will be formed during the densification step 420.

For example, the interphase is made up of a layer of boron nitride BN itself coated with a layer of silicon carbide SiC. The lower BN interphase layer acts as a matrix crack deflector while the upper SiC interphase layer ensures the integrity of the lower layer of the interphase and of the underlying fiber.

The thicknesses of the interphase and of the layers which can constitute it are defined by those skilled in the art according to the intended application. For example, the bottom layer of boron nitride is 500 nm thick and the upper layer of silicon carbide is 1,000 μm thick.

In one exemplary embodiment of the invention, a first preform of the tubular cell structure of the coating is obtained by mixing ceramic fillers with organics to obtain a mixture (feedstock). The ceramic fillers are the matrix powders and the discontinuous short fibers. The volume ratio of organics corresponds to the volume ratio of silicon ultimately in the structure made of CMC material with reinforcement of discontinuous short fibers. The same applies to ceramic fillers. After homogenization of this mixture, it is implemented by an additive manufacturing or direct manufacturing method of the powder injection molding (PIM) type. The additive manufacturing method is for example fused deposition modeling. A green body which may possibly undergo a machining step is then obtained.

The green body is then cleared of its organics by thermochemical treatments. This consists for example in forming a first pore network without expansion of the material, thus avoiding any premature cracking, then in removing the organics by thermal action. During removal, the material may expand in the first pore network formed. The material obtained only consists of ceramic fillers and its mechanical strength is very limited. This is then disposed on the blade assembly or the preform of the blade assembly and thus forms the preform of the root.

Whatever the embodiment of the invention, the discontinuous short fibers may be silicon carbide SiC fibers having an oxygen content less than or equal to 1% in atomic percentage. These fibers correspond to a type of SiC fiber available in industrial quantities in comparison with silicon carbide filaments resulting from chemical vapor deposition (CVD SiC filaments) with a carbon core usually used in the manufacture of parts made of metal matrix composite material. These SiC fibers may for example be fibers provided under the name "Hi-Nicalon-S" by the Japanese company NGS.

Whatever the embodiment of the invention, the tubular cell structure may comprise a ceramic matrix consisting of silicon carbide powders and silicon powders as well as a fibrous reinforcement of discontinuous short fibers in which:
the silicon carbide powders have a volume ratio comprised between 30% and 50% of the volume of the root;
the silicon powders have a volume ratio comprised between 25% and 45% of the volume of the root; and
the discontinuous short fibers with a volume ratio comprised between 10% and 25% of the volume of the root.

Preferably, the volume ratio of the silicon carbide powders is of 40%, that of the silicon powders is of 35% and that of the discontinuous short fibers is of 15%.

In an exemplary embodiment of the invention, the silicon carbide powders which form the ceramic matrix of the root are submicron powders having an average size d50 comprised between 200 μm and 1,000 μm. The average size d50 means that half of the particles have a characteristic dimension less than or equal to d50 and the other half of the particles has a characteristic dimension greater than or equal to d50.

In another exemplary embodiment of the invention, the silicon carbide powders which form the ceramic matrix of the root comprise larger particles with an average size d50 comprised between 1 μm and 50 μm, and more specifically between 15 μm and 25 μm.

The particle size of the powders makes it possible to adjust the pore network within the composite material forming the structure of the coating.

The expression "comprised between . . . and . . . " must be understood as including the bounds.

The invention claimed is:

1. A method for manufacturing an abradable coating including a tubular cell structure, the method comprising:
obtaining an assembly comprising a first preform of the tubular cell structure mounted on a second preform or on a turbomachine component, the first preform comprising a fibrous reinforcement of discontinuous short fibers and the second preform or the turbomachine component comprising a fibrous reinforcement of continuous fibers, and
densifying the first preform of the assembly by infiltration with a molten composition comprising silicon,
wherein the discontinuous short fibers have a length comprised between 50 μm and 500 μm.

2. The method for manufacturing an abradable coating according to claim 1, wherein the first preform is mounted on the second preform and wherein there is a co-densification of the first and second preforms by the molten composition.

3. The method for manufacturing an abradable coating according to claim 1, wherein the first preform is mounted on the turbomachine component and wherein the molten composition makes it possible to weld the tubular cell structure to the component.

4. The method for manufacturing an abradable coating according to claim 3, wherein the first preform is mounted on an abradable track of the turbomachine component.

5. The method for manufacturing an abradable coating according to claim 1, wherein obtaining the assembly comprises obtaining the first preform, by additive manufacturing or by powder injection molding, from a mixture present in a binder and comprising a matrix powder and discontinuous short fibers.

6. The method for manufacturing an abradable coating according to claim 1 wherein the second preform is a preform of a first-stage ring of a low-pressure turbomachine or the turbomachine component is the first-stage ring of the low-pressure turbomachine.

7. The method for manufacturing an abradable coating according to claim 1 wherein the second preform is a preform of a turbomachine stator or the turbomachine component is a turbomachine stator placed facing wipers located on a rotor opposite the stator.

* * * * *